United States Patent
Fang et al.

(10) Patent No.: US 11,860,651 B2
(45) Date of Patent: Jan. 2, 2024

(54) WATER OUTPUT DEVICE AND CONTROL METHOD

(71) Applicant: XIAMEN AXENT CORPORATION LIMITED, Xiamen (CN)

(72) Inventors: Yimin Fang, Xiamen (CN); Dongsheng Yao, Xiamen (CN); Guanjin Zhong, Xiamen (CN)

(73) Assignee: XIAMEN AXENT CORPORATION LIMITED, Xiamen (CN)

( * ) Notice: Subject to any disclaimer, the term of this patent is extended or adjusted under 35 U.S.C. 154(b) by 155 days.

(21) Appl. No.: 17/423,095

(22) PCT Filed: Jan. 20, 2020

(86) PCT No.: PCT/CN2020/073076
§ 371 (c)(1),
(2) Date: Jul. 14, 2021

(87) PCT Pub. No.: WO2020/156292
PCT Pub. Date: Aug. 6, 2020

(65) Prior Publication Data
US 2022/0129019 A1    Apr. 28, 2022

(30) Foreign Application Priority Data

Jan. 31, 2019   (CN) .......................... 201910095358.X

(51) Int. Cl.
*G05D 7/00* (2006.01)
*E03C 1/05* (2006.01)
(Continued)

(52) U.S. Cl.
CPC ................ *G05D 7/005* (2013.01); *E03C 1/04* (2013.01); *E03C 1/055* (2013.01); *E03C 1/057* (2013.01); *F16K 31/02* (2013.01); *F16K 37/0083* (2013.01)

(58) Field of Classification Search
CPC .......... G05D 7/005; E03C 1/057; E03C 1/055; E03C 1/04; F16K 37/0083; F16K 31/02
(Continued)

(56) References Cited

U.S. PATENT DOCUMENTS 8,482,409 B2 * 7/2013 Sawaski .............. F16K 37/0075
340/7.61
2007/0138421 A1 * 6/2007 Gibson ................... E03C 1/057
251/129.04

(Continued)

FOREIGN PATENT DOCUMENTS

CN      101706649 A     5/2010
CN      102168767 A     8/2011
(Continued)

OTHER PUBLICATIONS

The State Intellectual Property Office of People's Republic of China: First Office Action for CN App. No. 201910095358.X dated Jul. 30, 2021; 20 pages, including English translation.
(Continued)

*Primary Examiner* — Minh Q Le
(74) *Attorney, Agent, or Firm* — Schwabe, Williamson & Wyatt, PC

(57) ABSTRACT

An adjustment position of a water output device is provided. A flow volume adjustment component of the water output device has a first position corresponding to a flow volume greater than zero; upon detecting that the flow volume adjustment component reduces the flow volume to that corresponding to the first position, a detection component sends a signal to a control component; and the control component turns off an electronic waterway switch according to the signal. In this way, when the flow volume is reduced, the electronic waterway switch can be turned off by signal control, and in this case, the flow volume adjusted by the flow volume adjustment component is kept at a particu-
(Continued)

lar value, such that the next time water is output by a user using an electronic mode, the failure of water output would not occur.

19 Claims, 3 Drawing Sheets

(51) Int. Cl.
*F16K 31/02* (2006.01)
*E03C 1/04* (2006.01)
*F16K 37/00* (2006.01)

(58) Field of Classification Search
USPC .................. 137/1, 801, 315.12; 4/604, 602
See application file for complete search history.

(56) References Cited

U.S. PATENT DOCUMENTS

| | | | | |
|---|---|---|---|---|
| 2011/0114187 | A1* | 5/2011 | Sawaski | G05D 23/1393 |
| | | | | 137/1 |
| 2011/0253220 | A1* | 10/2011 | Sawaski | E03C 1/057 |
| | | | | 137/1 |
| 2012/0017367 | A1 | 1/2012 | Reeder | |
| 2012/0318364 | A1* | 12/2012 | Sawaski | E03C 1/055 |
| | | | | 251/129.01 |
| 2013/0062422 | A1* | 3/2013 | Marty | E03C 1/057 |
| | | | | 236/12.16 |
| 2013/0098489 | A1* | 4/2013 | Meehan | F21V 33/004 |
| | | | | 29/829 |
| 2016/0177551 | A1 | 6/2016 | Li | |
| 2018/0148912 | A1* | 5/2018 | Park | E03C 1/055 |
| 2018/0195711 | A1* | 7/2018 | Schneider, II | E03C 1/057 |
| 2018/0355593 | A1* | 12/2018 | Tracy | E03C 1/057 |
| 2019/0101219 | A1* | 4/2019 | Hatakeyama | E03C 1/0412 |
| 2020/0299941 | A1* | 9/2020 | Veros | F16K 19/006 |
| 2020/0356124 | A1* | 11/2020 | Bresson | G05D 23/1393 |
| 2021/0010251 | A1* | 1/2021 | Taki | G01V 8/10 |
| 2021/0148098 | A1* | 5/2021 | Shon | E03C 1/055 |

FOREIGN PATENT DOCUMENTS

| | | | | | |
|---|---|---|---|---|---|
| CN | 202074092 | U | * | 12/2011 | ............. F16K 21/04 |
| CN | 202074092 | U | | 12/2011 | |
| CN | 103195141 | A | | 7/2013 | |
| CN | 203322444 | U | | 12/2013 | |
| CN | 103711975 | A | * | 4/2014 | ............. F16K 31/04 |
| CN | 103711975 | A | | 4/2014 | |
| CN | 104197077 | A | | 12/2014 | |
| CN | 104534144 | A | | 4/2015 | |
| CN | 105042173 | A | | 11/2015 | |
| CN | 108561615 | A | | 9/2018 | |
| CN | 108591575 | A | | 9/2018 | |
| JP | 2017201200 | A | | 11/2017 | |
| WO | 2006/098795 | A2 | | 9/2006 | |

OTHER PUBLICATIONS

The State Intellectual Property Office of People's Republic of China; Chinese 2nd Office Action for CN Application No. 201910095358.X dated Mar. 3, 2022; 19 pages, including English translation.
European Patent Office: Extended European Search Report for European Application No. 20747660.7, dated Sep. 30, 2022; 8 pages.
International Search Report and Written Opinion for PCT/CN2020/073076 dated Aug. 6, 2020, including translation; 9 pages.

* cited by examiner

WATER OUTPUT DEVICE AND CONTROL METHOD

CROSS-REFERENCE TO RELATED APPLICATION

The present application is a national phase entry under 35 U.S.C. § 371 of International Application No. PCT/CN2020/073076, filed Jan. 20, 2020, which designates the United States of America, which claims priority to CN Application No. 201910095358.X, filed Jan. 31, 2019, the entire disclosures of each of these applications are hereby incorporated by reference in their entireties and for all purposes.

FIELD

The present application relates to the technical field of intelligent water output devices, and in particular to a manual and automatic operation integrated water output device.

BACKGROUND

With continuous improvement of living quality of people, functional requirements for faucets are also increasing, and automatic faucets are becoming more and more popular in people's lives, especially in public places. A conventional automatic faucet has a single performance, which only makes the waterway be blocked or unblocked by using the sensor to control the solenoid valve. Since it is impossible to control the water output during use, the automatic faucet is very inconvenient in use, and it is also very inconvenient to use the automatic faucet in a case that the water is required to be outputted for a long time.

Hence, there's technology of combining a sensing component with a mechanical faucet, when people use the faucet in the manual mode to get water for a long time, the automatic mode of the faucet also works normally, which causes unnecessary interference to the user. When adjusting the amount of the water output, the flow through the flow control valve is easily to be adjusted directly to zero, and thus, the faucet may not be able to output water when sensing control is used again, and the flow control valve must be re-operated to output water, which is not convenient. Besides, those who don't know the reason may have the misconception that the faucet has been damaged. Chinese Patent CN 101749456 A discloses an integrated temperature-adjusting dual-control automatic faucet, which provides two waterways for manual operation and sensing control respectively, but the structure of the device is very complicated.

SUMMARY

Technical Problem

Therefore, a problem to be solved by those skilled in the art is to provide a simple structure for controlling the electronic faucet more intelligently.

Solution to the Problem

Technical Solutions

A water output device and control method is provided according to the present application, which overcomes the shortcomings of the conventional technology described in the background.

The water output device provided according to the present application includes:
an electronic sensor component configured for sensing water signals;
a waterway electronic switch configured to be controlled by a signal to for opening or closing a waterway under the control of signals;
a flow adjusting component for adjusting a flow rate of outputted water;
a control component, which is communicatively connected to the waterway electronic switch and the electronic sensor component, and the control component controls the waterway electronic switch according to the signal sent by the electronic sensor component; and
the water output device further includes a detection component used for detecting a flow adjusting position of the flow adjusting component, and the detection component is communicatively connected to the control component; the flow adjusting component has a first position, and a flow rate corresponding to the first position is greater than zero; in a case that the detection component detects that the flow adjusting component reduces the flow rate to reach the first position (the flow adjusting component is changed from a position, where the flow rate is greater than the flow rate corresponding to the first position, to the first position), the detection component sends a signal to the control component, and the control component turns off the waterway electronic switch according to the signal.

Preferably, in a case that the detection component detects that the flow adjusting component increases the flow rate to pass the first position (the flow adjusting component is changed from the first position to a position where the flow rate is greater than the flow rate corresponding to the first position), the detection component sends a signal to the control component, and the control component turns on the waterway electronic switch according to the signal.

Preferably, the flow adjusting component further has a closed position where the flow rate is zero, the flow adjusting component is provided with a physical blocking member, in the case that the flow adjusting component reduces the flow rate to the first position (the flow adjusting component is changed from a position, where the flow is greater than the flow rate corresponding to the first position, to the first position), the flow adjusting component is affected by the physical blocking member and cannot directly continue changing to the closed position.

Preferably, the flow adjusting component is a flow adjusting mechanical valve controlled by a knob, and the flow rate of the outputted water is changed by changing an opening degree of the flow adjusting mechanical valve via rotating the knob.

Preferably, the first position is embodied as a flow adjusting range with a flow rate greater than zero; in a case that the detection component detects that the flow adjusting component is changed from a position, where a flow rate is greater than a maximum flow rate in the flow adjusting range, to the first position, the detection component sends the signal to the control component, and the control component turns off the waterway electronic switch according to the signal.

Preferably, the electronic sensor component includes one or a combination of a sensing module for sensing a proximity signal, a touch module for sensing a touch signal, a wireless remote control module and a gesture control module, and the control component controls the waterway electronic switch according to signal sent by the electronic sensor component.

Preferably, for signal control of the waterway electronic switch, the sensing module has a lowest priority level, so that the waterway electronic switch turned on by modules other than the sensing module cannot be turned off by the sensing module.

A control method for a water output device is provided according to the present application, including the following steps:

a waterway electronic switch is turned on by a control component according to a water demand signal received by the control component;

an effective closing signal is detected and sent to the control component by a detection component, and the control component turns off the waterway electronic switch; wherein the effective closing signal is that the detection component detects that a flow adjusting component reduces a flow rate to a first position (the flow adjusting component is changed from the position, where the flow rate is greater than the flow rate corresponding to the first position, to the first position), and the flow rate corresponding to the first position is greater than zero.

Preferably, the water demand signal is:

the detection component detects that the flow adjusting component increases the flow rate to pass the first position (the flow adjusting component is changed from the first position to a position where the flow rate is greater than the flow rate corresponding to the first position), or a proximity signal is sensed by a sensing module, or a touch signal is sensed by a touch module.

Preferably, the flow adjusting component further has a closed position where the flow rate is zero, the flow adjusting component is provided with a physical blocking member, so that when the flow adjusting component reduces the flow rate to the first position (the flow adjusting component is changed from a position, where the flow rate is greater than the flow rate corresponding to the first position, to reach the first position), it is affected by the physical blocking member and cannot directly continue changing to the closed position.

Preferably, mechanical resistance which is overcome while the flow adjusting component is changed from the first position to the closed position is greater than mechanical resistance which is overcome while the flow adjusting component reduces the flow rate to reach the first position (the flow adjusting component is changed from a position, where the flow rate is greater than the flow rate corresponding to the first position, to the first position).

Preferably, the flow adjusting component adjusts the flow rate of the outputted water by rotating a knob, and the knob must be pressed and rotated at the same time, to change the flow adjusting component from the first position to the closed position.

The water output device according to this application may be a faucet, a shower head, etc.

BENEFICIAL EFFECTS OF THE PRESENT DISCLOSURE

Beneficial Effects

Compared with the background technology, the technical solution of the present application has the following advantages:

1. The flow rate corresponding to the first position is greater than zero, when the detection component detects that the flow adjusting component reduces the flow rate to reach the first position (that is, the flow adjusting component is changed from a position, where the flow rate is greater than the flow rate corresponding to the first position, to the first position), it sends a signal to the control component, and the control component turns off the waterway electronic switch according to the signal. Thus, when the flow rate is reduced, the waterway electronic switch can be turned off by signal control, at this time, the flow rate of the flow adjusting component is maintained at a certain value, and thus when the user make the water be outputted via induction, touch and other methods next time, the situation that no water is outputted is avoided.

2. When the detection component detects that the flow adjusting component increases the flow rate to pass through the first position (that is, the flow adjusting component is changed from the first position to a position where the flow rate is greater than the flow rate corresponding to the first position), it sends a signal to the control component, and the control component turns on the waterway electronic switch according to the signal. Thus, not only the water inlet and outlet can be controlled by the electronic sensor component, but also the water inlet and outlet can be controlled during flow adjustment. Electronic control and mechanical control are perfectly combined, and manual control and automatic control complement each other without mutual interference.

3. Being affected by the physical blocking member, the flow adjusting component cannot directly continue changing to the closed position. The flow rate of the flow adjusting component may not be easily and directly adjusted to zero when the user adjusts the flow rate, instead, the closed position is available under special situations (for example, the electromagnetic valve is damaged), thus avoiding the situation that no water flows out after manual flow adjustment.

4. The flow adjusting component is a flow adjusting mechanical valve controlled by a knob, and the opening degree of the flow adjusting mechanical valve is changed by rotating the knob, so as to change the flow rate of the outputted water. Mechanical control and electronic control are integrated on the knob, which is convenient and reliable to operate.

5. The first position is embodied as a flow adjusting range where the flow rate is greater than zero, and thus the water outlet control may be performed more flexibly.

6. The sensing module has the lowest priority level, and thus the sensing module may not interfere with the work of other modules, which ensures the requirement for long time water outlet.

BRIEF DESCRIPTION OF THE DRAWINGS

Description of the Drawings

Figure 1:
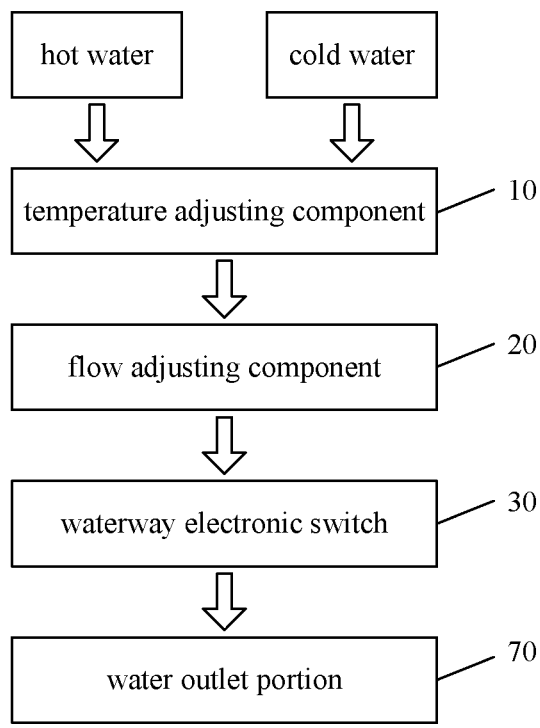
Figure 2:
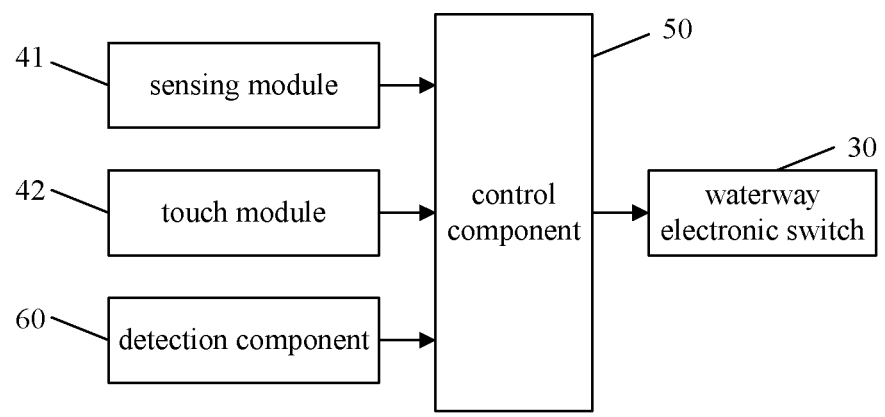
Figure 3:
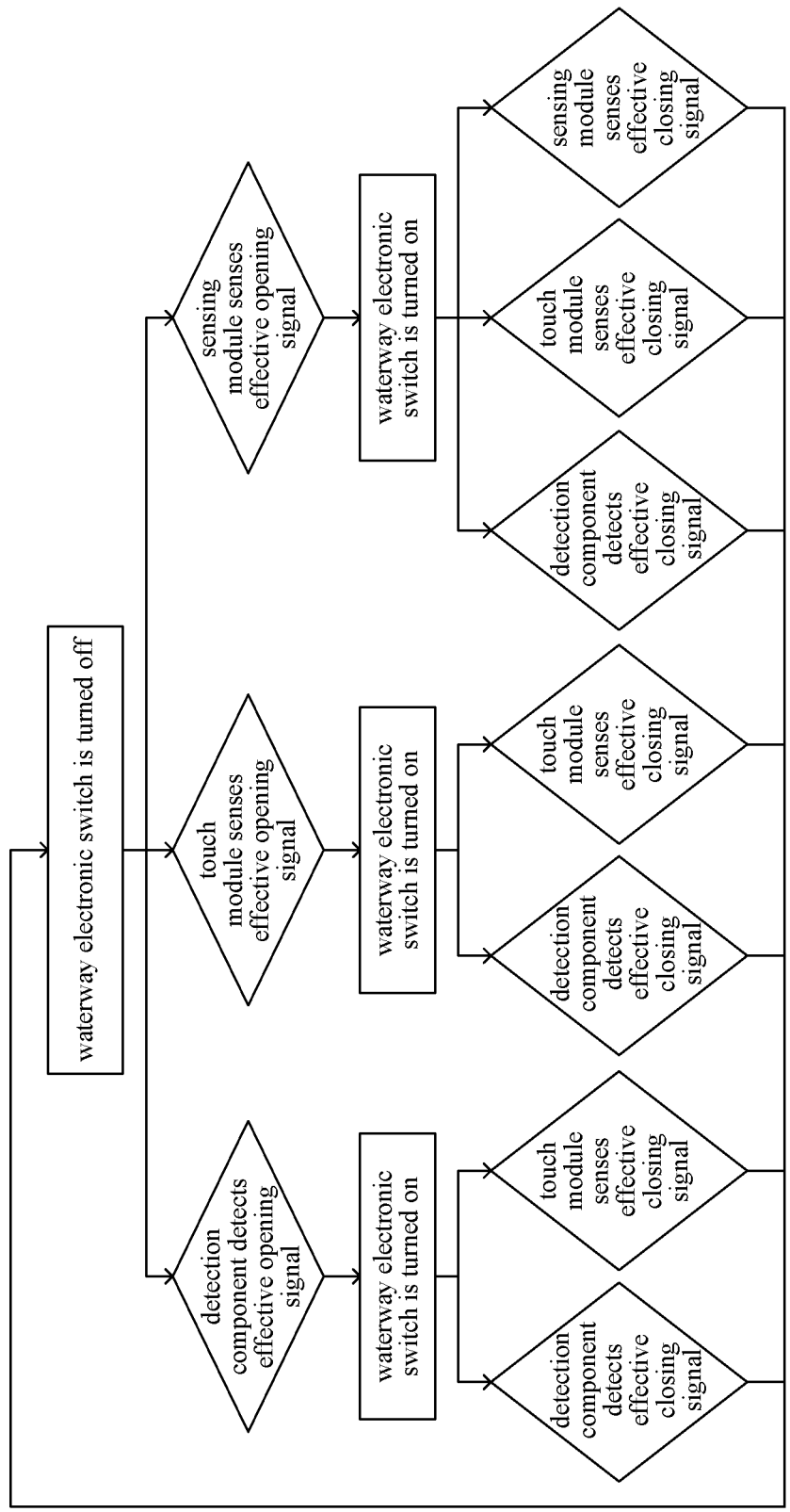
Figure 4:
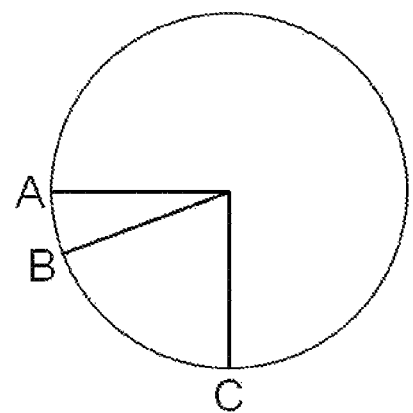

FIG. 1 is a schematic diagram showing a water flow direction in a water output device according to the present application;

FIG. 2 is a diagram showing an electronic control principle of the water output device according to the present application;

FIG. 3 is a control flow chart of the water output device according to the present application;

FIG. 4 is a schematic diagram of knob control of a flow adjusting component of the water output device according to the present application.

EMBODIMENTS

Detailed Description of the Embodiments

The present application is described in further detail hereinafter with reference to the drawings and specific embodiments.

As shown in FIGS. 1 to 3, a water output device includes a temperature adjusting component 10, a flow adjusting component 20, a waterway electronic switch 30, an electronic sensor component and a control component 50. The control component 50 is communicatively connected to the waterway electronic switch 30 and the electronic sensor component respectively. The electronic sensor component is used for sensing a water demand signal and sending the signal to the control component 50, the flow adjusting component 20 is used for adjusting a flow rate of outputted water, and the temperature adjusting component 10 is used for adjusting a temperature of the outputted water. The waterway electronic switch 30 is used for opening or closing a waterway under control of signal, and the control component 50 controls the waterway electronic switch 30 according to the signal sent by the electronic sensor component.

The flow adjusting component 20 has a closed position where the flow rate is zero, a fully open position where the flow rate is maximum, and a first position between the closed position and the fully open position (the flow rate corresponding to the first position is greater than zero). The water output device further has a detection component 60 for detecting a flow adjusting position of the flow adjusting component 20, and the detection component 60 is communicatively connected to the control component 50. When the detection component 60 detects that the flow adjusting component 20 reduces the flow rate to reach the first position (that is, the flow adjusting component 20 is changed from a position, where the flow rate is greater than the flow rate corresponding to the first position, to the first position), the detection component 60 sends a signal to the control component 50, and the control component 50 turns off the waterway electronic switch 30 according to the signal. When the detection component 60 detects that the flow adjusting component 20 increases the flow rate to pass the first position (that is, the flow adjusting component 20 is changed from the first position to a position where the flow rate is greater than the flow rate corresponding to the first position), the detection component 60 sends a signal to the control component 50, and the control component 50 turns on the waterway electronic switch 30 according to the signal.

A control method for the water output device in this embodiment includes the following steps:

the control component 50 turns on the waterway electronic switch 30 according to the water demand signal received by the control component;

the detection component 60 detects an effective closing signal and sends it to the control component 50, and the control component 50 turns off the waterway electronic switch 30, wherein the effective closing signal is that the detection component 60 detects that the flow adjusting component 20 reduces the flow rate to reach the first position (that is, the flow adjusting component 20 is changed from the position, where the flow rate is greater than the flow rate corresponding to the first position, to the first position), and the flow rate corresponding to the first position is greater than zero.

In this embodiment, as shown in FIG. 4, the flow adjusting component 20 is a flow adjusting mechanical valve controlled by a knob, and an opening degree of the flow adjusting mechanical valve is changed by rotating the knob, so as to change the flow rate of the outputted water. The knob is rotated between the closed position A and the fully open position C, and the first position B is located between the closed position A and the fully open position C. The flow rate increases when the knob is rotated counterclockwise while decreases when the knob is rotated clockwise. Correspondingly, the detection component 60 may be an angle sensor for detecting a rotation angle of the knob. However, it is not limited to this, the flow adjusting component 20 may be in other manners, for example, the flow rate of the outputted water may be controlled by rotation of a motor.

The function of the electronic sensor component in this application is to sense the water demand signal and send the signal to the control component 50, to control the waterway electronic switch 30. The electronic sensor component may include one or a combination of a sensing module 41 for sensing a proximity signal, a touch module 42 for sensing a touch signal, a wireless remote control module and a gesture control module. Therefore, the water demand signal may be a contact or non-contact signal, which includes but not limited to: the detection component 60 detects that the flow adjusting component 20 is changed to pass the first position to reach a position where the flow rate is greater than the flow rate corresponding to the first position, or the sensing module 41 senses the proximity signal, or the touch module 42 senses the touch signal, wherein the corresponding actions are represented by rotating the knob, approaching of a human body or an object, touching related components, or the like.

In this embodiment, the electronic sensor component includes the sensing module 41 for sensing the proximity signal and the touch module 42 for sensing the touch signal. Specifically, when a human body or an object enters a sensing area of the sensing module 41, the sensing module 41 sends a signal to the control component 50, and the control component 50 turns on the waterway electronic switch 30; when the human body or the object leaves the sensing area of the sensing module 41, the sensing module 41 sends a signal to the control component 50, and the control component 50 turns off the waterway electronic switch 30. When the touch module 42 is touched, the touch module 42 sends a signal to the control component 50, and the control component 50 turns on or turns off the waterway electronic switch 30.

Therefore, in this embodiment, each of the touch module 42, the sensing module 41 and the detection component 60 may send the signal to the control component 50, and the control component 50 controls the waterway electronic switch 30 according to the signal. For signal control of the waterway electronic switch 30, an order of priority level is that, the detection component 60 and the touch module 42 have the same priority level, which is higher than a priority level of the sensing module 41, and the sensing operation is effective on the premise that the waterway electronic switch 30 is off.

Referring to FIG. 3, control logic of the water output device according to this embodiment is as follows:

1. In the case that the waterway electronic switch 30 is off, the knob is rotated counterclockwise to pass the first position to increase the flow rate, the detection component 60 detects an effective opening signal, and the control component 50 turns on the waterway electronic switch 30. In this case, the sensing module 41 does not act, and the waterway electronic switch 30 is turned off only when a touch occurs (that is, the touch module 42 senses an effective closing signal) or the knob is rotated clockwise to reach the first position (that is, the detection component 60 detects an effective closing signal).

2. In the case that the waterway electronic switch 30 is off, a touch occurs at this time, the touch module 42 senses an effective opening signal, and the control component 50 turns off the waterway electronic switch 30. In this case, the sensing module 41 does not act, and the waterway electronic switch 30 is turned off only when another touch occurs (that is, the touch module 42 senses the effective closing signal) or the knob is rotated clockwise to reach the first position (that is, the detection component 60 detects the effective closing signal).

3. In the case that the waterway electronic switch 30 is off, a human body or an object enters the sensing area, the sensing module 41 senses the effective opening signal, and the control component 50 turns on the waterway electronic switch 30. In this case, if the human body or object leaves the sensing area (that is, the sensing module senses the effective closing signal), or a touch occurs (that is, the touch module 42 senses the effective closing signal), or the knob is rotated clockwise to reach the first position (that is, the detection component 60 detects the effective closing signal), the waterway electronic switch 30 can be closed; after being turned off, the waterway electronic switch 30 can be turned on again in the case that the human body or object leaves the sensing area and enters the sensing area again.

The temperature adjusting component 10 according to this application may be a thermostatic valve, and the waterway electronic switch 30 may be an electromagnetic valve, that is, cold water and hot water enter the thermostatic valve and flows to the flow adjusting component 20 after temperature adjustment, and then flows to the electromagnetic valve after flow adjustment, and finally flows out from a water outlet portion 70 of the water output device.

Preferably, the first position may also be a flow adjusting range in which the flow rate is greater than zero, that is, the first position is not a fixed point but as range, and there is a minimum flow rate (not zero) and a maximum flow rate within the range. When the detection component 60 detects that the flow adjusting component 20 is changed from the position, where the flow rate is greater than the maximum flow rate in the flow adjusting range, to reach the first position, the detection component 60 sends a signal to the control component 50, and the control component 50 turns off the waterway electronic switch 30 according to the signal; when the detection component 60 detects that the flow adjusting component 20 is changed from the first position to a position where the flow rate is greater than the maximum flow rate in the flow adjusting range, the detection component 60 sends another signal to the control component 50, and the control component 50 turns on the waterway electronic switch 30 according to the another signal.

Preferably, in this embodiment, the flow adjusting component 20 is provided with a physical blocking member, so that when the flow adjusting component 20 reduces the flow rate to the first position (the flow adjusting component 20 is changed from a position, where the flow rate is greater than the flow rate corresponding to the first position, to reach the first position), it is affected by the physical blocking member and cannot directly continue changing to the closed position. Specifically, in this embodiment, when the knob is rotated from the fully open position C to the first position B, it cannot directly pass the first position B and rotate to the closed position A due to the existence of the physical blocking member. The physical blocking member may be configured such that mechanical resistance to be overcome when the knob is changed from the first position B to the closed position A is significantly greater than mechanical resistance to be overcome when the knob is changed from a position where the flow rate is greater than the flow rate corresponding to the first position to reach the first position B. The physical blocking member may also be configured such that the flow adjusting component 20 may be changed freely between the first position B and the fully open position C by rotating the knob, but the flow adjusting component 20 can be changed from the first position B to the closed position A only when the knob is pressed and rotated at the same time. The specific implementation of the physical blocking member is not limited to the above solutions.

Of course, the flow adjusting component 20 may not be provided with a closed position where the flow rate is zero, that is, the flow rate may only be adjusted between the first position and the fully open position. When the detection component 60 detects that the flow adjusting component 20 is changed to reach the first position, the detection component 60 sends a signal to the control component 50, and the control component 50 turns off the waterway electronic switch 30 according to the signal; when the detection component 60 detects that the flow adjusting component 20 is changed from the first position to other positions, the detection component 60 sends another signal to the control component 50, and the control component 50 turns on the waterway electronic switch 30 according to the another signal.

The preferred embodiments of the present application are shown and described above. It should be understood that the present application is not limited to the solutions disclosed herein, and should not be regarded as an exclusion of other embodiments, instead, it may be used in various other combinations, modifications and environments, and may be modified according to the above teachings or technology or knowledge in related fields within the scope of the concept of the present application. The modifications and changes made by those skilled in the art which do not deviate from the spirit and scope of the present application shall fall within the protection scope of the claims of the present application.

INDUSTRIAL APPLICABILITY

When the flow rate is reduced, the waterway electronic switch of the water output device of the present application can be turned off by signal control, and the flow rate of the flow adjusting component is maintained at a certain value at this time, thus, when the user make the water be outputted via the electronic manners next time, the situation that no water is outputted is avoided.

The invention claimed is:

1. A water output device, comprising:
an electronic sensor component configured for sensing a water demand signal;
a waterway electronic switch configured for opening or closing a waterway under control of a signal;
a flow adjusting component configured for adjusting a flow rate of outputted water;
a control component, which is communicatively connected to the waterway electronic switch and the electronic sensor component, wherein the control component is configured to control the waterway electronic switch according to a signal sent by the electronic sensor component; and wherein
the water output device further comprises a detection component configured for detecting a flow adjusting position of the flow adjusting component, and the detection component is communicatively connected to the control component;

the flow adjusting component has a first position, and a flow rate corresponding to the first position is greater than zero; and in a case that the detection component detects that the flow adjusting component reduces the flow rate to reach the first position, the detection component is configured to send a signal to the control component, and the control component is allowed to turn off the waterway electronic switch according to the signal.

2. The water output device according to claim 1, wherein in a case that the detection component detects that the flow adjusting component increases the flow rate to pass the first position, the detection component is configured to send a signal to the control component, and the control component is allowed to turn on the waterway electronic switch according to the signal.

3. The water output device according to claim 1, wherein the flow adjusting component is a flow adjusting mechanical valve controlled by a knob, and the flow rate of the outputted water is changed by changing an opening degree of the flow adjusting mechanical valve via rotating the knob.

4. The water output device according to claim 1, wherein the first position is embodied as a flow adjusting range with a flow rate greater than zero; in a case that the detection component detects that the flow adjusting component is changed from a position, at which a flow rate is greater than a maximum flow rate in the flow adjusting range, to reach the first position, the detection component is configured to send the signal to the control component, and the control component is allowed to turn off the waterway electronic switch according to the signal.

5. The water output device according to claim 1, wherein the electronic sensor component comprises one or a combination of a sensing module for sensing a proximity signal, a touch module for sensing a touch signal, a wireless remote control module and a gesture control module, and the control component is configured to control the waterway electronic switch according to the signal sent by the electronic sensor component.

6. The water output device according to claim 5, wherein for signal control of the waterway electronic switch, the sensing module has a lowest priority level, to make the waterway electronic switch turned on by modules other than the sensing module cannot be turned off by the sensing module.

7. The water output device according to claim 1, wherein the flow adjusting component further has a closed position where the flow rate is zero and a fully open position where the flow rate is maximum, and the first position is located between the closed position and the fully open position.

8. The water output device according to claim 7, wherein the flow adjusting component is provided with a physical blocking member, in the case that the flow adjusting component reduces the flow rate to the first position, the flow adjusting component is affected by the physical blocking member and cannot directly continue changing to the closed position.

9. The water output device according to claim 1, further comprising a temperature adjusting component configured for adjusting a temperature of the outputted water, wherein water flows through the temperature adjusting component, the flow adjusting component and the waterway electronic switch in sequence.

10. The water output device according to claim 1, wherein the water output device is a faucet or a shower head.

11. A control method for a water output device, the water output device comprising a control component, a detection component, a waterway electronic switch and a flow adjusting component, wherein the control method comprises the following steps:

turning on the waterway electronic switch by the control component according to a water demand signal received by the control component;

detecting an effective closing signal by the detection component and sending the effective closing signal to the control component; and turning off the waterway electronic switch by the control component; and wherein the effective closing signal is that the detection component detects that the flow adjusting component reduces a flow rate to reach a first position, wherein the flow rate corresponding to the first position is greater than zero.

12. The control method for the water output device according to claim 11, wherein the water demand signal is: the detection component detects that the flow adjusting component increases the flow rate via the first position, or a sensing module senses a proximity signal, or a touch module senses a touch signal.

13. The control method for the water output device according to claim 12, wherein the flow adjusting component is a flow adjusting mechanical valve controlled by a knob, and the flow rate of outputted water is changed by changing an opening of the flow adjusting mechanical valve via rotating the knob; the flow rate is increased when the knob is rotated counterclockwise, and the flow rate is decreased when the knob is rotated clockwise; and in a case that the waterway electronic switch is off, and the knob is rotated counterclockwise to increase the flow rate via the first position, detecting an effective opening signal by the detection component, turning on the waterway electronic switch by the control component, and the sensing module does not act at this time; turning off the waterway electronic switch only when the touch module senses the effective closing signal or the knob is rotated clockwise to the first position.

14. The control method for the water output device according to claim 13, wherein in a case that the waterway electronic switch is off, and a touch occurs, sensing the effective opening signal by the touch module, turning on the waterway electronic switch by the control component, and the sensing module does not act at this time; turning off the waterway electronic switch only when the touch module senses the effective closing signal again or the knob is rotated clockwise to the first position.

15. The control method for the water output device according to claim 13, wherein in a case that the waterway electronic switch is off, and a human body or an object enters a sensing area, sensing the effective opening signal by the sensing module, and turning on the waterway electronic switch by the control component; in a case that the human body or the object leaves the sensing area, or the touch module senses the effective closing signal, or the knob is rotated clockwise to the first position, turning off the waterway electronic switch; after being turned off, the waterway electronic switch is allowed to be turned on in a case that the human body or the object leaves the sensing area and then enters the sensing area again.

16. The control method for the water output device according to claim 11, wherein the flow adjusting component further has a closed position where the flow rate is zero, the flow adjusting component is provided with a physical blocking member; when the flow adjusting component reduces the flow rate to the first position, the flow adjusting component is affected by the physical blocking member and cannot directly continue changing to the closed position.

17. The control method for the water output device according to claim 16, wherein mechanical resistance which is overcome while the flow adjusting component is changed from the first position to the closed position is greater than mechanical resistance which is overcome while the flow adjusting component reduces the flow rate to reach the first position.

18. The control method for the water output device according to claim 16, wherein the flow adjusting component adjusts the flow rate of the outputted water by rotating a knob, and the knob must be pressed and rotated at the same time, to change the flow adjusting component from the first position to the closed position.

19. The control method for the water output device according to claim 11, wherein the water output device is a faucet or a shower head.

\* \* \* \* \*